United States Patent Office 3,379,541
Patented Apr. 23, 1968

3,379,541
ALKALINE EARTH METAL HYDROXYLAPATITES, PROCESSES FOR PREPARING THE SAME AND COMPOSITIONS CONTAINING THE SAME
Melvin E. Tuvell, St. Ann, Mo., assignor to Monsanto Company, St. Louis, Mo., a corporation of Delaware
No Drawing. Filed Feb. 18, 1964, Ser. No. 345,585
10 Claims. (Cl. 106—38.27)

This invention relates to improved alkaline earth metal hydroxylapatites, processes for preparing the same and compositions containing the same, and more particularly to a process for preparing a synthetic alkaline earth metal hydroxylapatite, such as calcium hydroxylapatite, exhibiting improved properties as a mold dressing in the casting industry.

It is well known in the art that there is much confusion and misunderstanding about the chemical nature of the products as well as the nomenclature for such products known as tricalcium phosphate or calcium hydroxylapatite as evidenced by such references as Van Wazer, Phosphorus and Its Compounds, Interscience Publishers, Inc., New York, N.Y., vol. 1, (1958), pages 510 through 530 et seq. For example, the so-called "tricalcium phosphate" of commerce is in reality calcium hydroxylapatite which can vary in the molar ratio of calcium to phosphorus from between about 1.33 to about 2.0. In general, the calcium hydroxylapatite is usually defined as any compound in the $CaO-H_2O-P_2O_5$ system which exhibits an X-ray diffraction pattern which is very similar to the accepted pattern for calcium hydroxylapatite. For purposes of this invention, therefore, the alkaline earth metal hydroxylapatites are those compounds which exhibit an X-ray diffraction pattern which is very similar to the accepted pattern for the particular hydroxylapatite.

The so-called natural bone ash (calcium hydroxylapatite) produced by the calcination of degreased cattle bones after glue extraction has been extensively used as a mold dressing in the casting industry, especially for casting non-ferrous metals such as copper, brass and bronze. However, the synthetic calcium hydroylapatite, that is, the crystalline precipitate known in commerce as calcium hydroxylapatite, is unsuitable for use as a mold dressing.

In general, the mold dressing when slurried in water and sprayed onto a suitable mold produces a protective coating which, among other things, lubricates as well as covers imperfections on the mold thus reducing imperfections on the ingot surfaces and permitting ready release from the mold. Although the mold dressing should possess such properties as being readily dispersed in forming the mold dressing slurry and the like, a primary criteria for the mold dressing has been the "coating weight" as measured by the weight of calcium hydroxylapatite adhering to and covering a specific area of the mold. A high coating weight, depending upon casting process conditions, enables the use of a thicker coating and/or the use of a more dilute mold coating slurry thus providing improved ingot quality and/or cost savings in mold dressing. Heretofore, "coating weights," as determined by the procedure described hereinafter, for natural bone ash used as mold dressing have been below about 30 mg./in.² with the usual "coating weight" range being between about 6 to about 12 mg./in.². As can be appreciated, therefore, a synthetic alkaline earth metal hydroxylapatite exhibiting improved properties as a mold dressing including "coating weights" of greater than about 30 mg./in.² and in some cases as high as 50 mg./in.² or more would represent a significant advancement in this art.

It is, therefore, an object of this invention to provide an improved alkaline earth metal hydroxylapatite suitable for use as a mold dressing.

It is another object of this invention to provide a process for preparing improved alkaline earth metal hydroxylapatite suitable for use as a mold dressing.

It is another object of this invention to provide a calcium hydroxylapatite exhibiting a relatively high coating weight and other improved properties for use as a mold dressing.

It is another object of this invention to provide a process for preparing a synthetic calcium hydroxylapatite exhibiting a relatively high coating weight and other improved properties for use as a mold dressing.

It is still another object of this invention to provide a process utilizing economical raw materials for preparing improved calcium hydroxylapatite exhibiting improved properties as a mold dressing.

It is still another object of this invention to provide improved mold dressing compositions containing an improved alkaline earth metal hydroxylapatite such as calcium hydroxylapatite such as calcium hydroxylapatite.

These, as well as other objects of this invention, are accomplished by a process which comprises reacting an alkaline earth metal source and a phosphoric acid source in an aqueous medium in such a manner as to achieve an intermediate reaction product having a geometric weight mean particle diameter of less than 10 microns and preferably in the range from about 1 to 10 microns, and thereafter calcining the reacting product under conditions which produce an alkaline earth metal hydroxylapatite exhibiting improved properties in a mold dressing, all of which will be more fully discussed hereinafter.

In general, any alkaline earth metal source is suitable as long as it is capable of reacting with the phosphoric acid source acid to form an intermediate reaction product containing the desired alkaline earth metal. In particular, alkaline earth metal sources which contain moieties capable of producing or forming gases during the reaction or being volatilized away during the calcining step are preferred. Such alkaline earth metal sources include the inorganic alkaline earth metal sources, such as the salts, oxides and hydroxides which include $CaCO_3$, $Ca(OH)_2$, $CaO$, $MgO$, $Mg(OH)_2$, $MgCO_3$, and the like, including mixtures thereof. Although alkaline earth metal sources of strontium and barium can, in some cases, be used in practicing this invention, since they are relatively expensive and are not readily available, they are not believed to offer the advantages for use as the foregoing alkaline earth metal sources. Because such alkaline earth metal sources as $CaO$, $Ca(OH)_2$, and $CaCO_3$ are relatively inexpensive as well as being readily available they are the preferred alkaline earth metal sources for use in practicing the invention.

The phosphoric acid source suitable for use can be either orthophosphoric acid and/or condensed phosphoric acid, can be either wet process acid or furnace grade acid but preferably furnace grade acid, and is preferably concentrated, i.e., containing less than about 50% water by weight, with orthophosphoric acid between about 70 to about 85% $H_3PO_4$ by weight being especially preferred.

In general, the reaction of the alkaline earth metal source and the phosphoric acid source must be conducted in an aqueous medium under conditions which will produce an intermediate reaction product having a geometric weight mean particle diameter of less than 10 microns and preferably in the range from about 1 to 10 microns. Because the reaction product should be of a fine particle size and the fact that in the reaction of an alkaline earth metal source and orthophosphoric acid many water-insoluble reaction products are possible, such as mono- and dicalcium phosphates for the calcium alkaline earth metal, which are considered objectionable contaminants, the reaction should be carefully controlled in so far as such process conditions as degree and type of agitation and amount of aqueous medium are concerned.

The reaction should be conducted in aqueous medium which is sufficient to provide a suitable reaction medium for the degree and type of agitation which is necessary and this is usually at least about 30 weight percent of water per total reaction mixture of reactants and water. Amounts below about 30% are not sufficient to allow the degree of agitation which is necessary to produce the desired reaction product. Amounts as high as 85 to about 95 weight percent of water per total reaction mixture of reactants and water can be used although such amounts and those in excess are usually not desirable because of the degree and expense of processing required to remove such large amounts of the aqueous medium. It is preferred, therefore, that the amount of aqueous medium be from about 30 to about 85 weight percent of the total reaction mixture.

Although the reactants can be mixed in any order, it is preferred that the order of addition be the addition of the phosphoric acid source to an aqueous slurry and/or solution of the alkaline earth metal source. Also the rate of addition should be such as to permit with the type of agitation employed the production of the desired reaction product. The rate of addition to the reaction zone which is preferred is from about 30 to 80 lbs./hr. of 75% orthophosphoric acid over a reaction period of from about 1 hour to about 5 hours.

The degree of agitation which is necessary is vigorous or intense high shear agitation and should be sufficient to prepare the desired product, that is, an intermediate reaction product having a geometric weight mean particle diameter of less than 10 microns and preferably in the range of from about 1 to 10 microns. The geometric weight mean particle diameter as used herein is obtained by the centrifugal sedimentation technique using Mine Safety Appliance Co. equipment as described in Particle Size by R. R. Irani, and C. F. Callis, chapter 5, John Wiley (1963). As an example of the degree and type of agitation required, for a reaction mixture by weight of phosphoric acid (75% $H_3PO_4$) (2470 lbs.), lime (2450 lbs.) and water (10,000 lbs.) totalling about 14,920 pounds, a Cowles Dissolver Company impeller with a 44 inch diameter and operated at about 3,000 ft./min. top speed is suitable. It should be noted, however, that other types of mixers and agitators can be used if they are capable of comparable high shear agitation to produce a product having a geometric weight mean particle diameter of less than 10 microns and preferably in the range of from about 1 to 10 microns.

The reaction is usually exothermic and the temperature is preferably maintained between about 35° C. and the boiling point of the intermediate reaction product slurry with temperatures about 75 to about 85° C. being especially preferred. The amounts of alkaline earth metal source and phosphoric acid source used can vary depending upon reaction conditions, although substantially stoichiometric amounts are necessary, i.e., an alkaline earth metal oxide to phosphorus pentoxide molar ratio of between about 3.27:1 and 3.37:1, in order to consistently produce alkaline earth metal hydroxylapatite of desired quality. When using calcium hydroxide and orthophosphoric acid as the reactants the stoichiometric reaction can be represented by the following equation form:

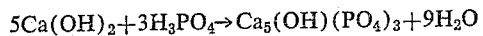

$$5Ca(OH)_2 + 3H_3PO_4 \rightarrow Ca_5(OH)(PO_4)_3 + 9H_2O$$

The intermediate reaction product formed by the reaction of the alkaline earth metal source and the phosphoric acid is calcined in order to produce the desired crystalline alkaline earth metal hydroxylapatite. As previously mentioned, the reaction product obtained from the reaction of the alkaline earth metal source and the phosphoric acid source is usually an intermediate wet mix reaction product and it has been found that not only physical changes but also chemical changes in the intermediate reaction product are produced by the calcination. It has been further found that calcination temperatures are important in so far as the quality of the alkaline earth metal hydroxylapatite for use as a mold dressing is concerned. The calcination temperature may vary, but in orded to prepare alkaline earth metal hydroxylapatites which exhibit improved properties as mold dressings, the product temperature should be between about 700° to 1100° C. during calcination. It has been found that calcination temperatures below about 700° C. yield an inferior quality mold dressing which, among other things, flakes and peels off the mold and is thus unacceptable. Calcination temperatures above about 1100° C. yield an inferior quality mold dressing which, among other things, exhibits a coating weight which is below about 30 mg./in.$^2$ and is thus undesirable.

The sojourn time of calcination for substantially complete conversion of the intermediate reaction product to the alkaline earth metal hydroxylapatite can vary with, in general, high calcination temperatures requiring less time but it is generally preferred that calcination times between about 15 and 300 minutes be used with calcination times between about 45 to 60 minutes being preferred.

In cases where the reaction product has an excessively high moisture content it may be necessary, for reasons such as increased economy in processing, to predry the reaction product to below about 30% moisture content before calcination in order to reduce the evaporation load during calcination. Such drying methods as oven drying, vacuum drying, drum drying, and the like, can be used for predrying the reaction product.

The alkaline earth hydroxylapatite product produced during the calcination is usually milled by suitable means in order to deagglomerate the material to a suitable particle size in order to produce a product exhibiting improved properties as a mold dressing.

Coating weight as used herein is a measure of the milligrams of the alkaline earth metal hydroxylapatite per square inch of a copper mold as determined according to the following procedure. A hollow cylindrical copper mold 1 inch in diameter and about 4 inches long is filled with mercury and heated to 140° C. A slurry is prepared from 50 grams of alkaline earth metal hydroxylapatite and 250 milliliters of distilled water under agitation for 10 minutes. A 250 milliliter beaker is filled with the test slurry to within ½ inch of the top of the beaker. The hot copper mold is dipped into the slurry in such a manner as to surround 3 inches of the mold with the slurry. The mold is then removed, allowed to dry, and redipped into the slurry in like manner a second time. After removing the mold from the slurry and allowing the coated mold to cool to room temperature, the coating is removed from the bottom of the mold and from ¼ inch below the 3 inch line so that the coating is only covering 2¾ inch of the cylinder. The mold is weighed, the coating is removed from the mold and the mold reweighed. Thus, the coating weight can be calculated by dividing the weight of the coating in milligrams by the surface area of the mold.

Alkaline earth metal hydroxylapatites in order to be suitable as a mold dressing should, among other things, be readily dispersed in the aqueous medium, have a high coating weight, that is, the ability to adhere to the mold, and provide an inert film under high temperatures such as are experienced between the mold and the molten metal in order to provide smooth surfaces on the cast metal and avoid contamination of the cast metal. It has been found that alkaline earth metal hydroxylapatites prepared according to the foregoing described process, that is, possess an alkaline earth metal hydroxylapatite structure as evidenced by X-ray diffraction analysis, have an alkaline earth metal oxide to phosphorus pentoxide molar ratio of from 3.27:1 to 3.37:1 and a geometric weight mean particle diameter of less than 10 micron and preferably from about 1 to 10 microns with about 80% of the material being less than 16 microns and preferably from about 1 micron to 16 microns, exhibit superior qualities as a mold dressing. Such alkaline earth metal hydroxylapatites exhibit a high coating weight, i.e., a coating weight above about 30 mg./in.$^2$ and which in some cases may reach as high as 50 mg./in.$^2$ and higher, are relatively inert at high temperatures as shown by a total ignition loss (800° C. for 1 hour) of 1.1% maximum, are readily dispersed in water, and form a smooth film on the mold.

In using alkaline earth metal hydroxylapatites of the type described in the immediately foregoing paragraph as a mold dressing, it is usually only necessary to suspend the desired amount of the hydroxylapatite in water to provide the desired consistency (usually from about 10 to about 30 percent total solids and preferably from about 15 to about 24 percent total solids) and agitating the mixture to provide a uniform suspension. The suspension is then employed as a mold wash, or may be applied to the mold by spray or brush application, as is well known in the art. Generally the mold dressing is applied to a hot mold such that there is sufficient heat to volatilize all moisture from the coating slurry. Where a mold may be coated sold it is usually necessary that the coated mold be heated under conditions which will remove all moisture prior to employing the mold far casting.

To illustrate the invention, the following example is presented with parts by weight unless otherwise indicated.

EXAMPLE

A lime slurry is made up to about 619 parts of lime and about 2520 parts of water with the temperature being maintained at about 85° C. To this slurry is added about 623 parts of 75% orthophosphoric acid at a uniform rate such that the acid is added to the mixture over a period of about 3 hours. The reaction mixture is undergoing intense high shear agitation while the acid is added. The reaction mixture is then drum dried to about 30% by weight water content and is then calcined at about 840° C. for about 30 minutes after which it is milled to about 99% through a 325 mesh sieve (U.S.S.S.).

The finished material, about 833 parts, is within the following specification:

Alkaline earth metal oxide to phosphorus pentoxide molar ratio _____ 3.27:1 to 3.37:1
Total ignition loss (800° C. for 1 hour) _%max__ 1.1
Geometric weight mean particle dia. _____ <10µ
Percent of material having particle dia. <16µ ____ <80
Coating weight _____mg./in.$^2$__ >30

The above material when slurried in water to about 20 weight percent solids exhibits exceptional mold dressing properties when applied by spray to hot molds used in casting such nonferrous metals as copper, bronze, alumium, aluminum bronze, magnesium and the like.

In addition, it should be noted that similar or comparable results are also obtained under substantially the same process conditions as described in the example when using other alkaline earth metal sources such as CaCO$_3$, MgO, Mg(OH)$_2$, and MgCO$_3$ in equivalent molar amounts.

What is claimed is:
1. A process for preparing an alkaline earth metal hydroxylapatite having an alkaline earth metal oxide to phosphorus pentoxide molar ratio of between about 3.27:1 to about 3.37:1 and exhibiting improved mold dressing properties when dispersed in water which comprises reacting in substantially stoichiometric amounts a phosphoric acid and an alkaline earth metal source selected from the group consisting of inorganic alkaline earth metal salts, oxides, hydroxides and mixtures thereof contining moieties capable of being removed as gases under the conditions specified herein in an aqueous medium of from about 30% to about 95% by weight of the total reaction mixture under intense high shear agitation to produce an intermediate reaction product having a geometric weight mean particle diameter of less than 10 microns, and thereafter calcining said reaction product at product temperatures from about 700 to 1100° C. for a time sufficient to produce said hydroxylapatite.

2. The process of claim 1, wherein said alkaline earth metal hydroxylapatite is calcium hydroxylapatite and said alkaline earth metal source is a calcium source selected from the group consisting of CaO, Ca(OH)$_2$, CaCO$_3$, and mixtures thereof.

3. The process of claim 2, wherein said aqueous medium is from about 30% to 85% by weight of the total reaction mixture.

4. The process of claim 3, wherein said intermediate reaction product has a geometric weight mean particle diameter of from about 1 to 10 microns.

5. A process for preparing a calcium hydroxylapatite exhibiting improved mold dressing properties when dispersed in water which comprises reacting orthophosphoric acid and calcium hydroxide in an aqueous medium of from about 30% to 85% by weight of said reaction mixture, said reactants being reacted in a molar ratio of calcium oxide to phosphorus pentoxide of from about 3.27:1 to 3.37:1, said reaction being carried out under intense high shear agitation whereby an intermediate reaction product having a geometric weight mean particle diameter of less than 10 microns is obtained, and thereafter calcining said reaction product at product temperatures from about 700 to 1100° C. for a time sufficient to produce said calcium hydroxylapatite.

6. An improved alkaline earth metal hydroxylapatite exhibiting when used as a mold dressing improved coating quality, said hydroxylapatite characterized by having an alkaline earth metal oxide to phosphorus pentoxide molar ratio of from about 3.27:1 to 3.37:1, a total ignition loss after treatment at 800° C. for one hour of less than about 1.1 weight percent, and a geometric weight mean particle diameter of from about 1 to 10 microns with about 80 weight percent having a particle diameter of from about 1 micron to about 16 microns.

7. The hydroxylapatite of claim 6, wherein said alkaline earth metal is calcium.

8. The calcium hydroxylapatite of claim 7, wherein said calcium hydroxylapatite exhibits a coating weight of greater than 30 milligrams per square inch when slurried with water in amounts from about 10 to about 30 weight percent.

9. An improved mold dressing composition comprising an admixture of an alkaline earth metal hydroxylapatite of claim 6 and water, said admixture comprising from about 10 to about 30 weight percent solids and exhibiting a coating weight of greater than 30 milligrams per square inch.

10. The mold dressing of claim 9, wherein said alkaline earth metal hydroxylapatite is calcium hydroxylapatite.

References Cited

UNITED STATES PATENTS

| | | | |
|---|---|---|---|
| 2,442,969 | 6/1948 | Butt | 23—108 X |
| 2,879,169 | 3/1959 | Teicher | 106—38.27 |
| 3,149,081 | 9/1964 | Bowman et al. | 23—109 X |

ALEXANDER H. BRODMERKEL, *Primary Examiner.*

D. J. ARNOLD, *Examiner.*

J. B. EVANS, *Assistant Examiner.*